May 25, 1937.  T. LANE  2,081,487
BORING BAR ATTACHMENT
Filed Dec. 9, 1935  2 Sheets-Sheet 2
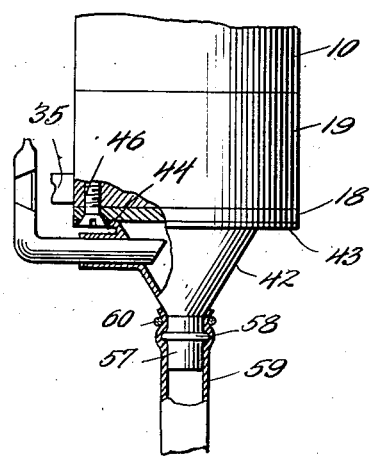
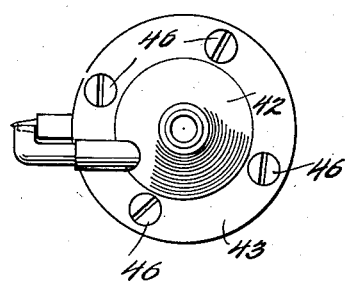
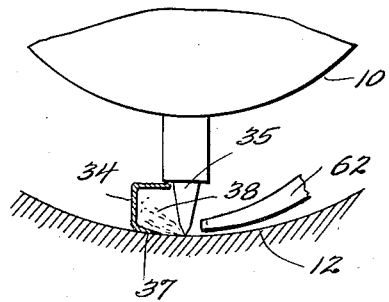
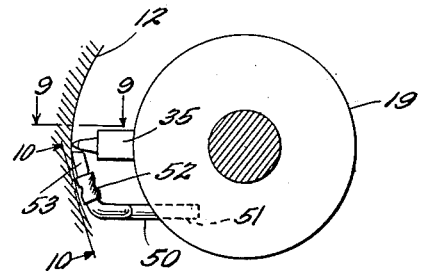
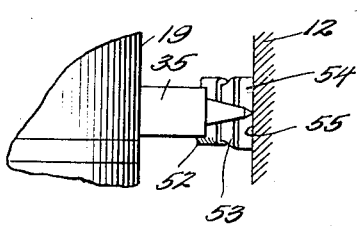
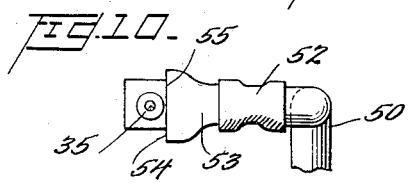
Inventor
Thomas Lane
By Henry H. Snelling
Attorney Patented May 25, 1937

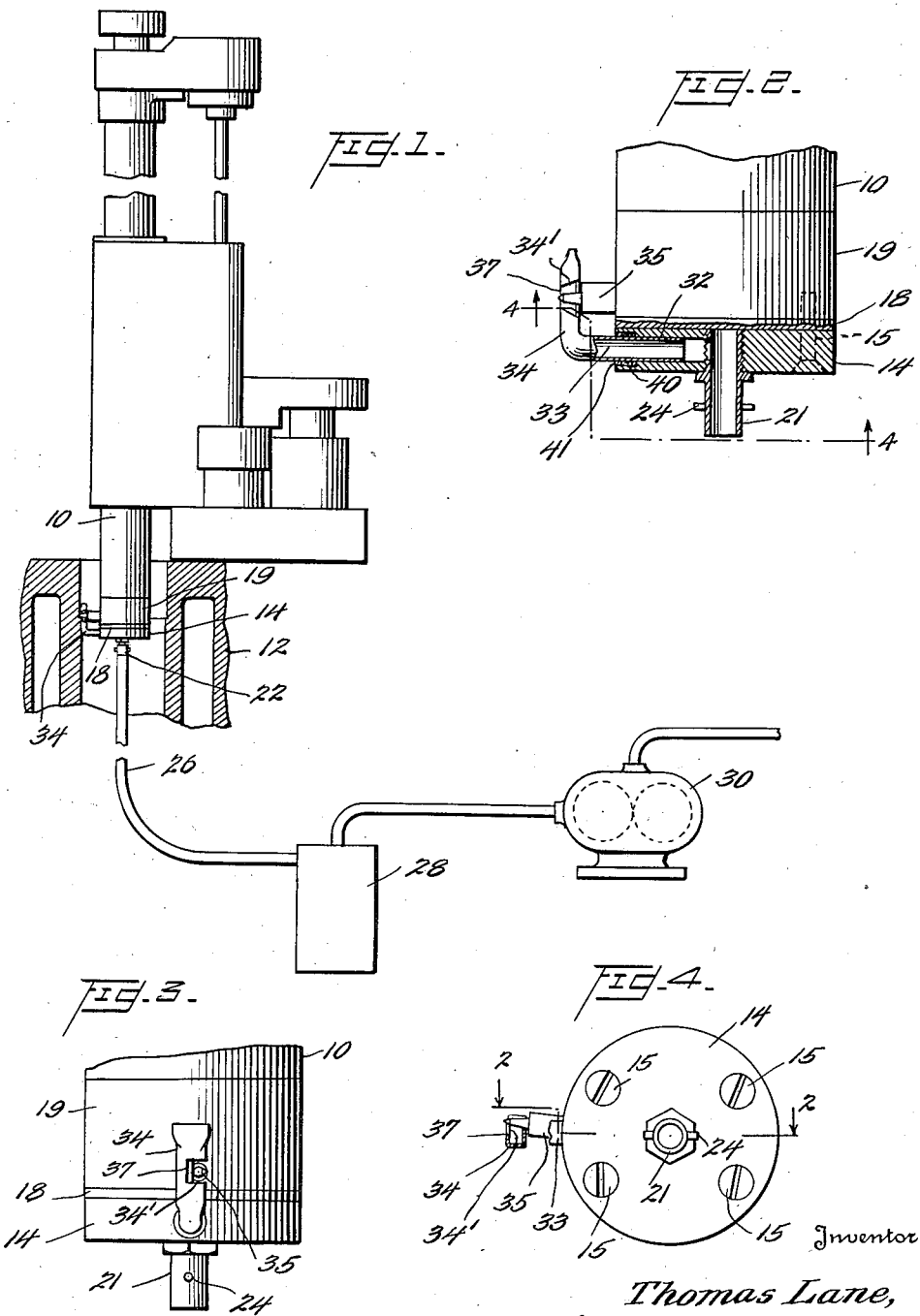

2,081,487

UNITED STATES PATENT OFFICE 2,081,487

BORING BAR ATTACHMENT

Thomas Lane, Atlanta, Ga.

Application December 9, 1935, Serial No. 53,649

16 Claims. (Cl. 77—55)

This invention relates to a method and apparatus for gathering or collecting the dust and cuttings from boring tools of the fly cutter type and has for its primary object the provision of a dust and cuttings collector which collector travels with and adjacent to the point of the cutting tool whereby to gather all the dust and cuttings from the point of the tool as they are produced. Another object is the provision of a light cleaner that may be quickly and easily attached to all kinds of boring tools of this type.

My invention is adapted primarily for use with boring tools used in reconditioning the cylinder walls of all types of cylinders but especially the walls of cast iron cylinders of reciprocating engines and more particularly in automobile, truck and tractor engines. The invention is primarily for use with rotating boring bars of the fly cutter type but as will be apparent later on it is not limited to this type.

Another object is the provision of a vacuum cleaner for cylinder boring tools which not only picks up all the borings and dust created at the point of the cutting tool but which at the same time has a decided cooling effect on the tool. Still another object is the provision of a cleaner which is of small size and permits observation of the work at all times and is also always out of the way and offers no obstruction to adjustment of the cutting tool.

A further object is the provision of a cleaner which is quickly and easily detachable and adjustable whereby offering no impedance to the changing of the boring bar to another cylinder as soon as one is finished.

My device is extremely light and compact and by the use of adapters can be quickly attached to almost any make of boring bar of the fly cutter type.

In the automobile repair business it is common practice to rebore the cylinders of the engines and many types of relatively light portable boring bars of the fly cutter type are now in universal use for this purpose. The boring bars of this type are sufficiently light to be easily transported from one garage or shop to another so that one machine may serve quite an extended territory thus avoiding the expense of moving the engines to a central shop. In getting ready for the boring process it is the usual practice to remove the cylinder head of the automobile engine and then to drop the crank case but to leave the crank shaft and main bearings undisturbed. The reason for not disturbing the crank shaft and main bearings is that this saves several hours time and incidentally avoids the considerable cost of realining the shaft and bearings after the cylinders are bored. But when leaving the shaft and bearings in place it is of extremely great importance that none of the dust and cuttings produced in the reboring process reach the bearings and for this reason several attempts have been made to prevent the cuttings from falling toward the bearings. Two main methods are in general use, one is to catch the dust and grindings in a funnel-shaped cup at the bottom of the cylinder being rebored and another method is to cause a draft of air to flow upward into a conduit which carries the dust and cuttings away. Both of these methods have a common drawback which is that the cast iron dust generated by the cutting tool collects on the cylinder walls and it is therefore necessary to scour the cylinders after a reboring job and this washing of the cylinders is a relatively costly job due to the time expended. Furthermore, the updraft method has the disadvantage that a great expenditure of power is required to produce a full cylinder air stream of sufficient velocity to carry the heavier particles out of the cylinder and it is practically impossible to produce a draft of air of such great volume and having enough velocity to remove the dust from the walls.

The main purpose of my invention is to provide an economical device which adds practically nothing to the weight of the boring machine and which is so highly efficient in removing all the dust and cuttings that no cleaning of the cylinders is necessary after the reboring is finished. Furthermore, the orifice at the mouth piece of my scavenger tool is so shaped with respect to the cutting tool that not only the cuttings and dust are caught and carried away but also any dust that might be on the cylinder walls is removed at the same time. In my present machine the dust and cuttings produced and also the dust on the cylinder walls are so effectively removed that the engine may be immediately reassembled without the necessity of additional cleaning thereby saving much time and labor in the reconditioning of the engine.

In the drawings:

Figure 1 is a perspective view of my improved cleaner attached to the bottom of a single fly cutter tool bit holder and connected to a vacuum pump;

Figure 2 is a vertical sectional elevation along line 2—2 of Figure 4;

Figure 3 is a detail showing a front elevation of the cleaner mouth piece partly encircling the tool bit and fitted in the carrying plate;

Figure 4 is a bottom plan view of the carrying plate attached to the tool bit holder.

Figure 5 is an elevation partly in section of a modified form of carrier plate.

Figure 6 is a bottom plan view of the modified form shown in Figure 5.

Figure 7 is a horizontal section taken on a plane just above the boring bit and showing a further modification.

Figure 8 is a plan view of a still further modification.

Figure 9 is a partly sectional rear elevation taken on line 9—9 of Figure 8.

Figure 10 is side elevation of the collector and tube shown in Figure 8.

In its simplest form as shown in Figure 1 in which the boring bar 10 of a well known make is associated in working position on a cylinder block 12, the carrying plate 14 is removably secured as by screws 15 through the bottom plate 18 of the revolving boring bar head 19 and has in the center arranged coaxially with the rotatable head 19 a downwardly projecting connecter 21 for connection with a non-rotating swivel connecter 22 in an air tight manner as by a bayonet lock 24. The swivel connecter 22 is connected by means of a flexible air line 26 with a cuttings trap and air filter 28 which in turn is connected to a suction pump 30. The air or suction line 26 with its connections to the pump may be of any known kind and I lay claim to no particular part of the line, the chamber or the suction pump. Inserted in a bore 32 in the carrying plate 14 is the tubular stem 33 of the mouth piece 34 which is substantially vertical and provided with an orifice 34' shaped so as to partly encircle the front portion of the point of the cutting bit 35 and having a sharp edge 37 in the side adjacent the cylinder wall whereby the cuttings 38 at the point of the bit may be thrown, blown or sucked into the orifice 34' as they are cut from the cylinder walls in the boring operation as shown in Figure 7. The cutting bit 35 is adjustable in and out of the boring bar head 19 in a well known manner whereby the boring machine may be used on cylinders of different diameters and in order to have my dust collector adjustable with the length of the bit I make the stem 33 of such a size as to fit snugly in the bore 32 but loose enough to be movable in and out of the bore. The bore 32 may be counterbored as at 40 and provided with rubber washers 41 for making an air tight but adjustable fit with the stem, see Figure 2.

Referring to Figures 5 and 6 the modified form of carrying plate 42 is funnel shaped and provided with a horizontal flange 43 which has holes 44 corresponding to screw holes in the bottom plate 18 of the boring bar head 19 whereby the carrying plate may be quickly connected to the head merely by removing the screws 46 and replacing them with longer screws which hold the carrying plate 42 as well as the bottom plate 18.

The connecter 21 may be attached to the plate 14 in any known manner or it may be integral therewith as shown in Figure 5 but in my present machine I provide a screw threaded engagement with the plate 14.

In Figure 8 is shown a horizontal section thru a part of the cylinder 12 and the head 19 just above the boring bit 35 and showing a plan view of a modified form of cleaner attachment which consists of a stem 50 carried in a bore 51 of a carrier plate hidden from view. It will be noted that the bore 51 is not radial but is located parallel to the diameter but as far as possible toward the edge of the plate in order to permit bends of larger radii of curvature in the stem 50. Connected to the free end of the stem 50 is a short piece of rubber tubing forming a resilient connection 52 which carries in its end a short mouthpiece 53 having a flattened funnel shaped mouth orifice 54. This mouthpiece 53 is preferably of very fine hard steel and the wall engaging lip 55 is a knife edge and as sharp as possible in order that the particles cut from the cylinder walls do not hit the edge and ricochet out of the mouthpiece. The bends in the stem 50 and the length of the resilient connection and mouth piece are such that the knife edge lip of the mouth piece is held in flat contact with the cylinder wall at all times. As is well known to those acquainted with the boring art the bit travels around the cylinder a great many times for each fraction of inch of axial travel and it is partly due to this fact that my cleaning arrangement and process is able to take away every bit of dirt and dust from the cylinder wall during the reboring leaving it so clean that a white cloth may be rubbed over the surface without becoming soiled. The axial movement of the cutting tool in the cylinder is so slow that the vertically elongated lip of the mouthpiece passes over any one helical cutting path a great many more times than is necessary to clean off all of the dust. The wall contacting lip of the mouthpiece 53 is slightly in advance of the other lip so that a strong draft acts on the cylinder wall at all times during the boring process assuming that a high suction is maintained. Figure 9 is a view looking into the orifice or mouth 54 and Figure 10 is a side elevation along line 10—10 of Figure 8. The mouthpiece 53 is of such hard steel that it has quite a long life and yet is so cheap that it can be thrown away whenever the wall contacting lip becomes worn away or feather edged.

Reverting back to Figure 5 attention is called to the quickly detachable swivel connection which consists of a rotating connection 57 having an annular ridge 58 covered by the end 59 of the suction line which end is held in place by the ring 60 that may be easily slipped up to permit the easy removal of the hose end 59 or slipped down to lock the hose end in place. Due to the suction in the tube the connection is air tight but permits relative rotation of the connection and hose.

In Figure 7 is shown a compressed air nozzle 62 located just behind the cutting point for blowing the cuttings into the orifice 34'. This modification serves to cool the bit with about the same efficiency as the suction method thereby not only to prevent the elongation of the bit 35 but also to prolong the life of the cutting point.

The suction or compressed air attachments shown in Figures 1 to 10 may be used to good advantage even where suction and compressed air lines are not available since the cuttings fly from the cutting point with great force like small bullets and are carried down into the line 26 before their energy is expended. However, the advantage of cooling the cutting point is not present in the absence of the high velocity air stream around the point.

Some boring tools do not have a removable bottom plate 18 so that for these types I provide a funnel attachment which has an upright cuff on its upper edge of sufficient diameter to telescope over the bottom of the rotating head or bottom portion of the boring bar. By providing horizontal set screws in the vertical periphery of the funnel I am able to attach the same to the rotating head. It is my intention to provide cleaner attachments to be quickly connected to all types of boring bars and the scope of my claims is to include this broad idea.

What I claim is:

1. A device for scavenging cylinders in a boring process in which a fly cutter is used which comprises conduit means adjacent the cutting tool and adapted to rotate therewith, said means having an orifice directly in front of the fly cutter point and in the path of the cuttings shot off by the cutting point of the tool and means for creating a stream of air of high velocity around said tool point for carrying the dust and cuttings into said orifice.

2. A device for carrying away the dust and cuttings from the point of a cutting tool which comprises conduit means adjacent the point of the tool and adapted to travel with the tool, said means having an orifice directly in the path of the cuttings shot off by the point of the tool, a stationary conduit connection at the opposite end of said conduit means and a swivel connection for connecting the conduit means with said conduit connection whereby permitting movement of the conduit means with respect to the conduit connection.

3. In combination, a flexible tubing suction line, a fly cutter boring bar having a fly cutter bit carried thereby, a vacuum mouth piece connected to rotate with the boring bar and having an intake adjacent the point of the fly cutter bit and in front of said cutter bit point, and a swivel connection between the flexible tubing and the mouth piece.

4. In combination with a boring bar of the fly cutter type, a boring bit carried thereby, a tube having a cutting receiving opening adjacent the cutting point of the boring bit, means for creating suction in said tube and means for driving said tube end and cutting point in synchronism whereby as the boring bit cuts away metal the cuttings are carried away by the tube.

5. The method of collecting dust and chips from the bore of a cylinder being dressed by a revolving boring bar carrying one or more tool bits, which consists in concentrating a flowing stream of air against the wall of the cylinder about the point of each tool bit, such air moving from the tool bit point in substantial alinement with the usual path of chips as they are produced by the tool bit, and in the same direction as the point is moving and directing the air stream with the thus entrained dust and chips to a dust collecting container.

6. A cutting collector for boring machines of the type employing a revolving bar carrying one or more tool bits to dress a cylindrical bore, comprising a nozzle having a cutting receiving opening, means for mounting the nozzle so as to rotate with the bar in constant proximity to the tool bit point and the point of contact between the bit and the bore wall, and a suction line communicating with said nozzle, the area of the opening in said nozzle being approximately the same as the cross section area of said line.

7. The device of claim 6 in which an edge of the nozzle opening substantially engages the bore wall.

8. The device of claim 6 in which a margin of the nozzle opening is thinned to a knife edge and said edge substantially engages the bore wall.

9. The device of claim 6 in which the nozzle is tubular, has a vertical portion closed at the top, and a vertical portion of the tube is notched to provide the opening, whereby the point of the tool bit may be located within the notch and so be substantially surrounded by the margin of the opening.

10. The device of claim 6 in which one edge of the nozzle opening is yieldingly held in engagement with the bore wall.

11. In combination, a revolving bar, a tool bit carried thereby to dress a cylinder to be bored, a suction nozzle mounted to revolve with the bar in front of the point of the bit closely proximate thereto, the opening of the nozzle facing the bit and of an area just sufficient to receive the cuttings produced by the bit as they are formed.

12. In combination, a revolving boring bar, a tool bit carried thereby to dress a cylindrical bore, a suction nozzle revolving with said bar in front of and closely adjacent to the point of the tool bit to catch the cuttings as they are produced, a suction producing device, and a suction passage leading from the nozzle to said device.

13. A device adapted to be attached to the rotating, tool bit carrying member of a boring machine, comprising a carrier having a fluid passage therein, a tube slidable in said carrier, having a cutting receiving opening and adapted to be moved so as to be immediately in front of the point of the tool bit and against the wall of the cylindrical bore being dressed, and means for exhausting air across the tool bit point into the cutting receiving opening and thru the fluid passage of the carrier.

14. The device of claim 13 in which the tube is L-shaped, closed at the top, and the opening is bounded on the bore wall side by a knife edge.

15. The device of claim 13 in which the tube consists of two rigid parts jointed by a flexible hose, the opening in the tube is bounded on one side by a knife edge which is resiliently held by said flexible hose in contact with the wall of the bore being dressed.

16. The device of claim 13 in which the tube includes a horizontal section and a vertical section, the horizontal section being slidable radially of the carrier and the vertical section having said opening therein below its closed top, said opening being roughly trapezoidal in elevation, the short parallel side being tapered like a knifeedge to snugly engage the wall of the bore.

THOMAS LANE.